(12) United States Patent
Wang et al.

(10) Patent No.: US 12,551,600 B2
(45) Date of Patent: Feb. 17, 2026

(54) METHOD FOR PREPARING ARTIFICIAL TENDON AND ARTIFICIAL TENDON PREPARED THEREFROM

(71) Applicant: National Tsing Hua University, Hsinchu (TW)

(72) Inventors: Tzu-Wei Wang, Hsinchu (TW); Hao-Xuan Chen, Hsinchu (TW); Yu-Chung Liu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 497 days.

(21) Appl. No.: 18/332,526

(22) Filed: Jun. 9, 2023

(65) Prior Publication Data

US 2024/0316251 A1    Sep. 26, 2024

(30) Foreign Application Priority Data

Mar. 20, 2023    (TW) .................................. 112110196

(51) Int. Cl.
*A61L 27/54*    (2006.01)
*A61K 38/18*    (2006.01)
*A61L 27/36*    (2006.01)

(52) U.S. Cl.
CPC .......... *A61L 27/54* (2013.01); *A61K 38/1825* (2013.01); *A61K 38/1841* (2013.01); *A61K 38/1866* (2013.01); *A61L 27/3604* (2013.01); *A61L 2300/414* (2013.01)

(58) Field of Classification Search
CPC ...... A61L 27/36; A61L 27/54; A61L 27/3604; A61L 2300/414; A61K 38/18; A61K 38/1825; A61K 38/1841; A61K 38/1866
See application file for complete search history.

(56) References Cited

U.S. PATENT DOCUMENTS

| | | | |
|---|---|---|---|
| 6,458,889 B1 * | 10/2002 | Trollsas | C09J 153/00 525/425 |
| 2019/0015549 A1 * | 1/2019 | Paukshto | A61L 27/3804 |
| 2021/0260556 A1 * | 8/2021 | Kim | C08K 3/22 |

* cited by examiner

*Primary Examiner* — Vi X Nguyen
(74) *Attorney, Agent, or Firm* — MUNCY, GEISSLER, OLDS & LOWE, P.C.

(57) ABSTRACT

The present disclosure provides a method for preparing an artificial tendon, and the artificial tendon prepared therefrom. The present disclosure uses interfacial polyelectrolyte complexation spinning, and collocates with the self-designed collection machine to produce micron and millimeter-scale fibers, and through the weaving method, it is made into a tailor-made artificial substitute, which is applied to artificial tendons with high tensile strength and durability.

20 Claims, 7 Drawing Sheets

METHOD FOR PREPARING ARTIFICIAL TENDON AND ARTIFICIAL TENDON PREPARED THEREFROM

CROSS-REFERENCE TO RELATED APPLICATION

This application claims priority of Taiwan patent application No. 112110196, filed on Mar. 20, 2023, the content of which is incorporated herein in its entirety by reference.

BACKGROUND OF THE INVENTION

1. Field of the Invention

The present invention relates to a method for preparing an artificial tendon and the artificial tendon prepared therefrom.

2. The Prior Art

Natural tendon is affected by the low density of blood vessels and cells in the tissue. After injury, nutrients, oxygen and other substances cannot be transported to the damaged part in a short period of time, which often leads to poor self-repair ability of the tendon. Currently, artificial tendons are limited by their material properties, and artificial substitutes often fail to promote the regeneration and repair of the original tissue, often resulting in fatigue relaxation or re-fracture after long-term use. In addition, artificial substitutes have biocompatibility issues such as low biodegradability and poor integration with tissues to be resolved.

In order to solve the above-mentioned problems, those skilled in the art urgently need to develop a novel method for preparing an artificial tendon and the artificial tendon prepared therefrom for the benefit of a large group of people in need thereof.

SUMMARY OF THE INVENTION

A primary objective of the present invention is to provide a method for preparing an artificial tendon, comprising the following steps: (a) forming an artificial fiber through interfacial polyelectrolyte complexation spinning (IPC spinning) process, wherein the artificial fiber is formed by spinning on a machine using a positively charged polysaccharide polymer and a negatively charged polyamino acid polymer; (b) coating the artificial fiber with a protein to form a coated artificial fiber; (c) twisting the coated artificial fiber to form an artificial fiber bundle; and (d) using a weaving method to braid the artificial fiber bundle to form the artificial tendon with a hierarchical structure; wherein in step (a), the positively charged polysaccharide polymer and the negatively charged polyamino acid polymer are respectively in a form of positively charged droplets and negatively charged droplets, and the positively charged polysaccharide polymer and the negatively charged polyamino acid polymer are dropped on the machine, and the artificial fiber is fabricated by contact of the positively charged droplets and the negatively charged droplets through pulling upward.

Another objective of the present invention is to provide an artificial tendon, which is prepared by the aforementioned method.

According to an embodiment of the present invention, the artificial tendon has the hierarchical structure.

According to an embodiment of the present invention, the positively charged polysaccharide polymer is chitosan.

According to an embodiment of the present invention, the negatively charged polyamino acid polymer is poly-γ-glutamic acid (γ-PGA).

According to an embodiment of the present invention, in step (b), the protein is silk fibroin.

According to an embodiment of the present invention, in step (d), the weaving method is a three-strand braid interlaced weaving method.

According to an embodiment of the present invention, an amount of the positively charged droplets or the negatively charged droplets is five drops.

According to an embodiment of the present invention, the contact of the positively charged droplets and the negatively charged droplets forms the artificial fiber with orientation of droplets to form shield-core structure, a binary structure or a micro-array structure.

According to an embodiment of the present invention, the artificial tendon is loaded with a growth factor.

According to an embodiment of the present invention, the growth factor is transforming growth factor beta (TGF-β), insulin-like growth factor 1 (IGF-1), platelet-derived growth factor (PDGF), vascular endothelial growth factor (VEGF), connective tissue growth factor (CTGF), or fibroblast growth factor 2 (FGF2).

According to an embodiment of the present invention, the artificial tendon comprises a polyelectrolyte complex nanoparticle (PCN), the PCN is formed by polymerization of the positively charged polysaccharide polymer and a negatively charged glycosaminoglycan polymer through positive and negative attraction, the positively charged polysaccharide polymer is chitosan, and the negatively charged glycosaminoglycan polymer is heparan sulfate.

In summary, the present invention uses interfacial polyelectrolyte complexation spinning, and collocates with the self-designed collection machine to produce micron and millimeter-scale fibers, and through the weaving method, it is made into a tailor-made artificial substitute, which is applied to artificial tendons with high tensile strength and durability.

BRIEF DESCRIPTION OF THE DRAWINGS

The following drawings form part of the present specification and are included here to further demonstrate some aspects of the present invention, which can be better understood by reference to one or more of these drawings, in combination with the detailed description of the embodiments presented herein.

DETAILED DESCRIPTION OF THE PREFERRED EMBODIMENT

In the following detailed description of the embodiments of the present invention, reference is made to the accompanying drawings, which are shown to illustrate the specific embodiments in which the present disclosure may be practiced. These embodiments are provided to enable those skilled in the art to practice the present disclosure. It is understood that other embodiments may be used and that changes can be made to the embodiments without departing from the scope of the present invention. The following description is therefore not to be considered as limiting the scope of the present invention.

Definition

As used herein, the data provided represent experimental values that can vary within a range of ±20%, preferably within ±10%, and most preferably within ±5%.

Unless otherwise stated in the context, "a", "the" and similar terms used in the specification (especially in the following claims) should be understood as including singular and plural forms.

According to the present invention, the definition of the term "interfacial polyelectrolyte complexation spinning (IPC spinning)" can be referred to Do, Minjae, et al. *Advanced Functional Materials* 27.42 (2017): 1702017; LIN, Yufan, et al. *Journal of Materials Research*, 2020, 35.2: 122-131; Domingues, Rui M A, et al. *Tendon Regeneration*. Academic Press, 2015. 259-280.

Figure 1:
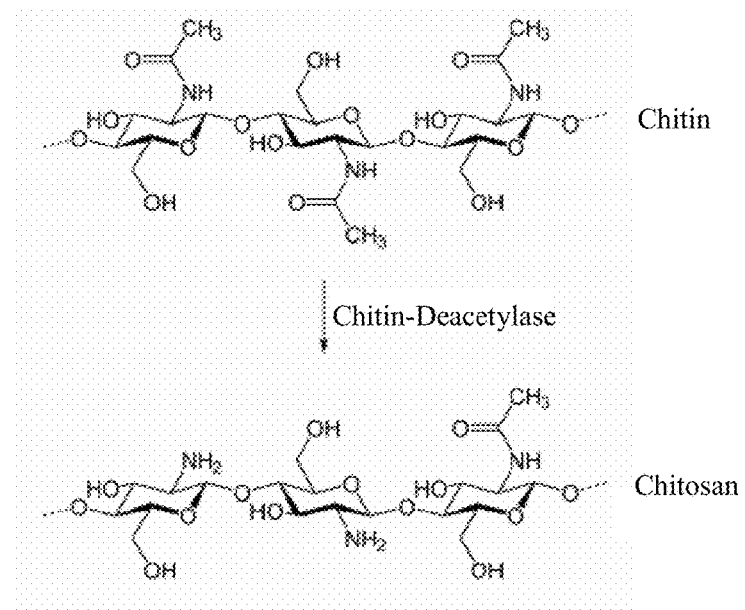
FIG. 1 shows the synthesis pathway of chitosan.

According to the present invention, the term "chitosan" is a positively charged polyion at pH 5, widely used in various biomedical applications, is an intrinsically polysaccharide with properties of low toxicity, biodegradability and antimicrobial activity. The synthesis pathway of chitosan is shown in FIG. 1.

According to the present invention, the term "poly-γ-glutamic acid (γ-PGA)" is a negatively charged polyamino acid molecule at pH 7, which has biodegradable, non-toxic, non-immunogenic and antibacterial properties. Enhanced collagen fibril production is observed by addition of polyglutamate. The presence of PGA also stimulates angiogenesis, and γ-PGA has anti-inflammatory activity. γ-PGA has the following chemical structure (I):

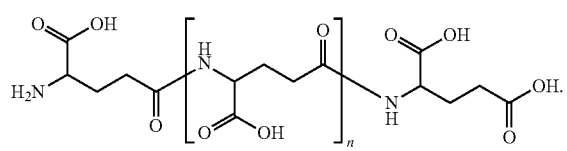

(I)

According to the present invention, the term "heparan sulfate" refers to a linear polysaccharide containing multiple sulfate groups, which is a highly negatively charged biomolecule.

Example 1

Preparation of Artificial Tendon

Figure 2:
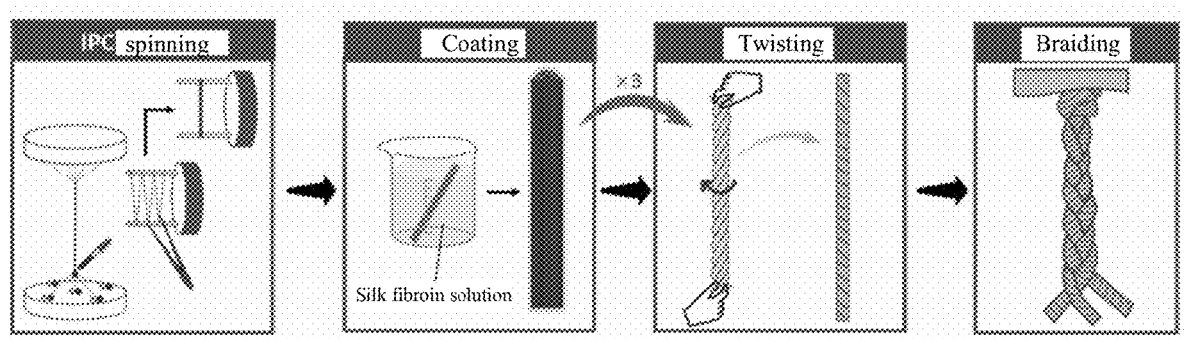
FIG. 2 shows the steps of the method for preparing the artificial tendon according to the present invention, in which IPC represents interfacial polyelectrolyte complexation.
Figure 3:
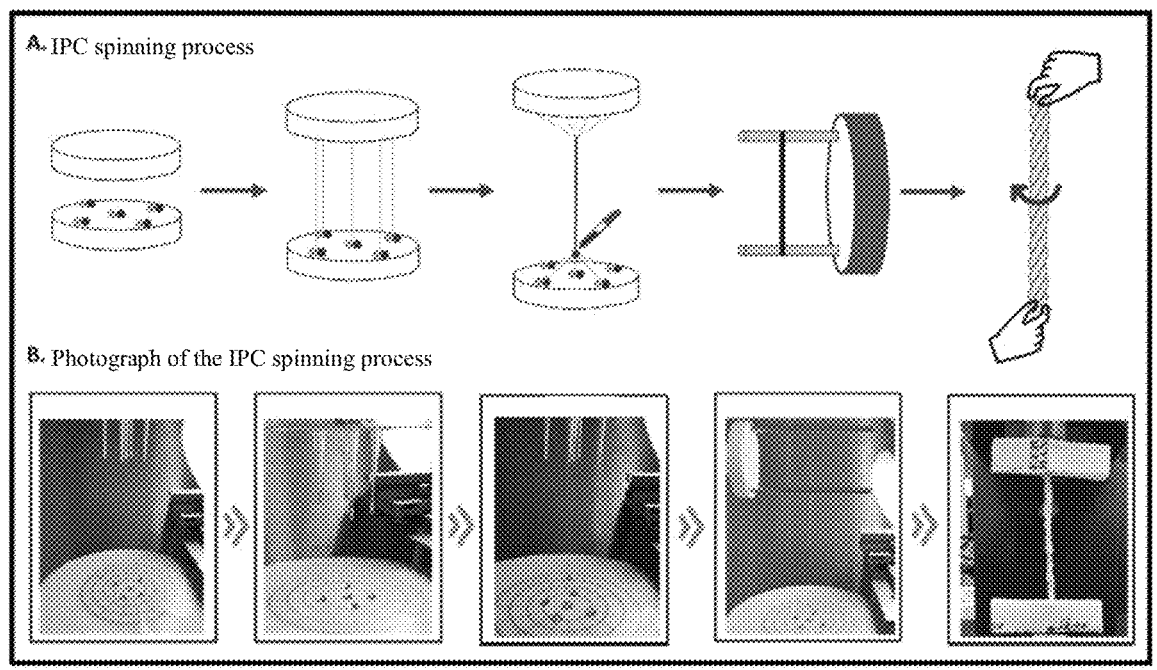
FIG. 3 shows the procedure of interfacial polyelectrolyte complexation (IPC) spinning.

The present example illustrates the process of using the method of the present invention to prepare the artificial tendon. The method steps of this example are briefly shown in FIG. 2. The procedure of interfacial polyelectrolyte complexation (IPC) spinning is shown in FIG. 3. The materials used in this example are shown in Table 1 below.

TABLE 1

| Chemical | M.W. (g/mol) | Brand | Cat# | Storage |
|---|---|---|---|---|
| Chitosan (low molecular weight) | 50,000-190,000 | Sigma | 9012-76-4 | RT |
| poly-γ-glutamic acid (γ-PGA) | 95,000-120,000 | Vedan Biotechnology | 25513-46-6 | RT |
| silk fibroin | 100,000 | Self-prepared | — | 4° C. |
| Glacial acetic acid (99.8%) | — | J T Baker | JT-9508-01 | RT |

The detailed procedure of this example is as follows. Part 1: Preparation of polyelectrolyte solution. Positively and negatively charged polyelectrolyte solutions are respectively formed at room temperature. 0.15 g chitosan powder is dissolved in 10 mL of acetic acid solution, and 0.75 g γ-PGA powder is dissolved in 10 mL of deionized water.

Part 2: See FIG. 2 for the IPC spinning steps and FIG. 3 for the interfacial polyelectrolyte complexation spinning (IPC spinning) process. 1. Dispense five sets of positively and negatively charged polyelectrolyte solution droplets on the loading plate. 2. Lower down the fiber formation platform to make the two oppositely charged electrolyte solution droplets contact to each other and form an interface between each set of two droplets. The fiber formation platform consists of a polystyrene disc with 20 μL pipette tips fixed underneath. The position of the tip of the pipette tips would be aligned with the middle of the positive and negative solutions on the loading plate below. Therefore, when the fiber formation platform descends, the tip of the pipette can contact the positively and negatively charged polyelectrolyte solution, and make the two droplets form a contact interface. When the platform ascends, the two droplets can generate IPC reaction process for continuous spinning. 3. Rise the fiber formation platform, and the IPC fibers will be successfully produced. 4. When the length of the fiber reaches 5 cm, turn on the motor of the loading plate to rotate the loading plate and form an intersection point of 5 fibers. 5. Dispense a droplet of fusion solution (γ-PGA solution) to fuse the above-mentioned 5 fibers into 1 fiber bundle. 6. As the fiber formation platform reaches the height of the collector device, stop the movement of the fiber formation platform and install the 5-cm-long collector device for fiber collection. 7. Turn on the motor of the collector device to collect and assemble the fibers automatically. 8. Repeat steps 2 to step 7 for a total of 5 times; then, a fiber fascicle with a length of 5 cm and a diameter of 1 mm can be obtained.

Part 3: See coating in FIG. 2. 1. Apply the silk fibroin solution homogeneously on the fascicles. 2. Air dry the fascicles in the laminar flow hood. 3. Repeat steps 1-2 for 3 times, and the coated fascicles can be obtained.

Part 4: See twisting in FIG. 2. Three pairs of coated fascicles are immobilized on the fiber-twisting device. One drop of fusion solution (silk fibroin solution) is dispensed to soften the coated fascicles and adsorbed on the coated fascicles before twisting. The fiber twisting device is rotated to wind the fiber bundles (90°/cm). The twisted fiber bundles are air dried in the laminar flow hood.

Figure 4:
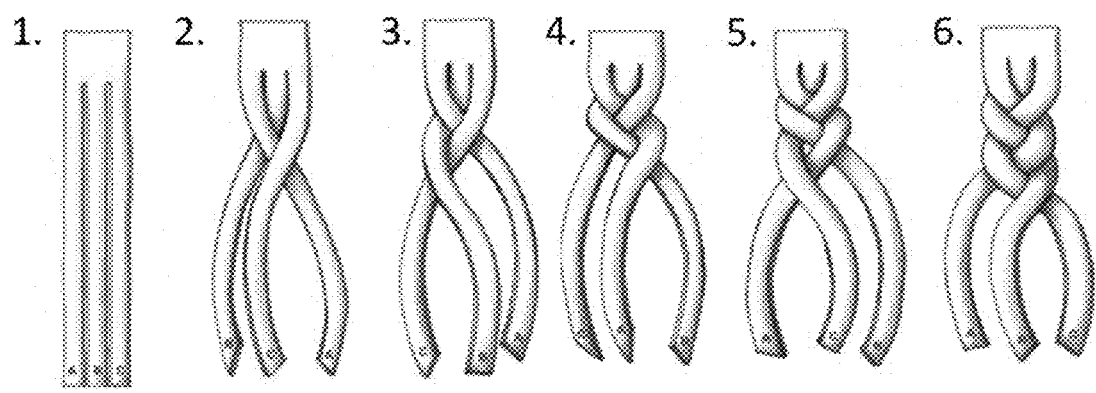
FIG. 4 shows the three-strand braid interlaced weaving method.

Part 5: See braiding in FIG. 2. Three pairs of twisted fiber fascicles are stabilized on a culture dish for braiding. The steps of three-strand braid interlaced weaving method shown in FIG. 4 are then conducted. Finally, the woven scaffold with a pattern of three-strand braids is successfully fabricated.

Example 2

Morphology of Artificial Tendon Fibers and Scaffolds

Figure 5:
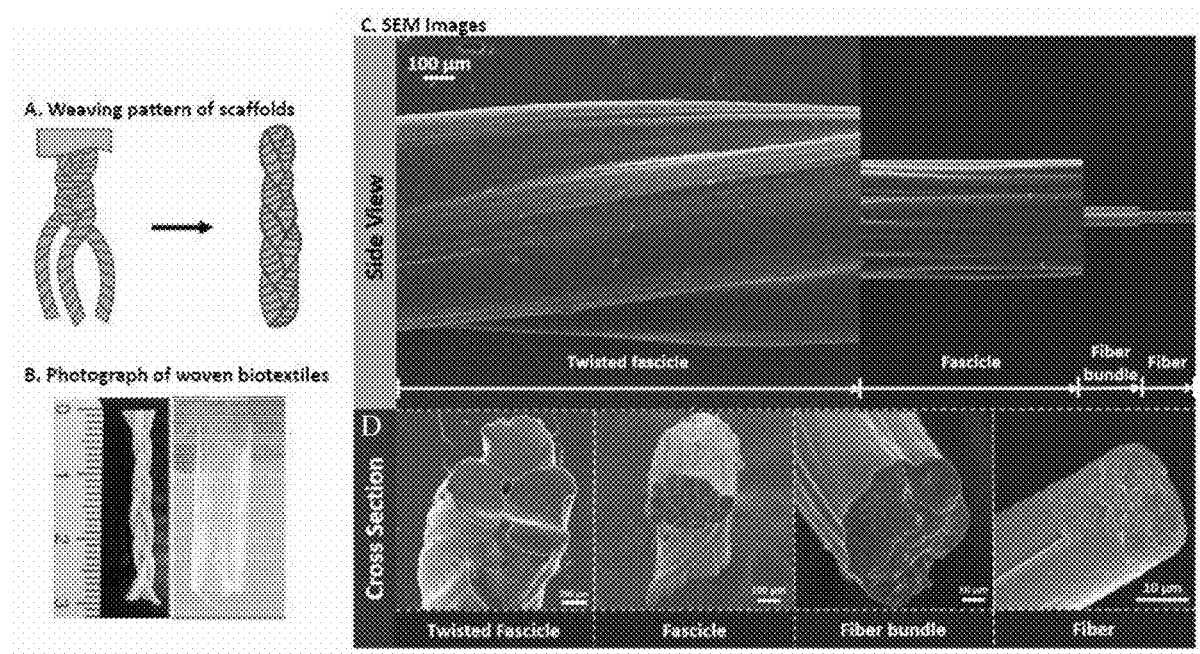
FIG. 5 shows the morphology of artificial tendon fibers and scaffolds, in which SEM represents scanning electron microscope.

This example investigates the morphology of artificial tendon fibers and scaffolds. The result is shown in FIG. 5. It can be seen from FIG. 5 that A and B show that the braided scaffolds are indeed braided by a three-strand braid. C is a side view of the fiber (side view), showing that the fiber is from the first hierarchy (fiber) to the fourth hierarchy (twisted bundle), and the scale is from small to large. D is a cross-section view, and it can be observed from the yellow dotted line that the fibers of each hierarchy are composed of multiple fibers of the previous hierarchy. Through the results of C and D, it can be confirmed that the hierarchical structure has indeed been successfully constructed.

Example 3

Mechanical Properties of IPC Fibers of Artificial Tendon

Figure 6:
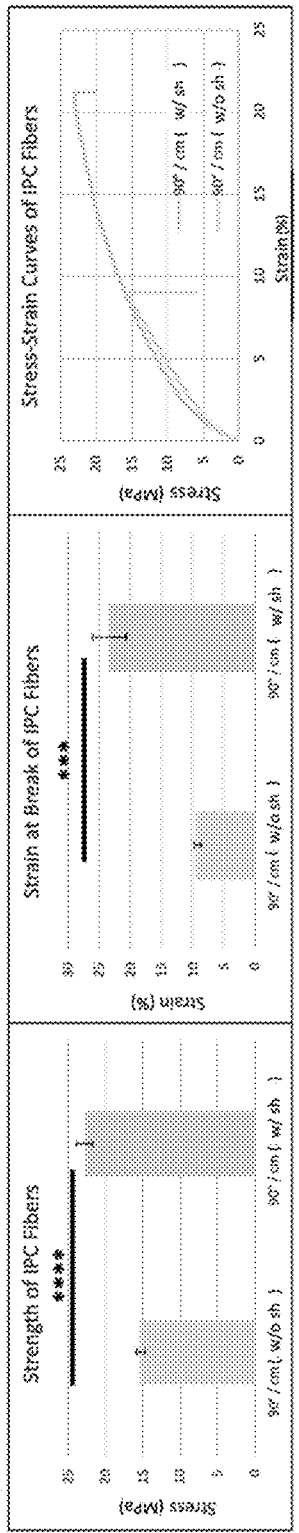
FIG. 6 shows the mechanical properties of the IPC fibers of the artificial tendon.
Figure 6:
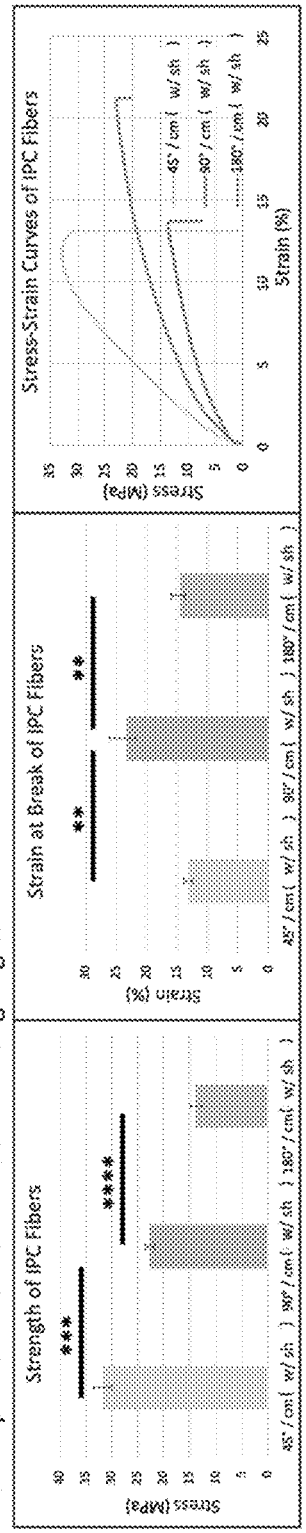

This example investigates the mechanical properties of the IPC fibers of the artificial tendon. The result is shown in FIG. 6. It can be seen from FIG. 6 that from the comparison results with and without the sheath (i.e., coating), it can be observed that when the fiber is added with the sheath, both the strength and the breaking strain are improved, indicating that the sheath has the function of enhancing the mechanical properties of the fiber. The comparison of different twisting angles shows that when the fibers are integrated through twisting, different angles would cause different strength and strain of the fibers. Therefore, the mechanical properties of the fiber can be adjusted by varying the angle to make it more in line with the needs of artificial tendons. In addition, regarding the effect of fiber bundle twisting angle on mechanical properties, the artificial tendon fibers would have the strongest mechanical strength when twisted at 45 degrees.

Example 4

Biocompatibility Characteristics of Artificial Tendon

Figure 7:
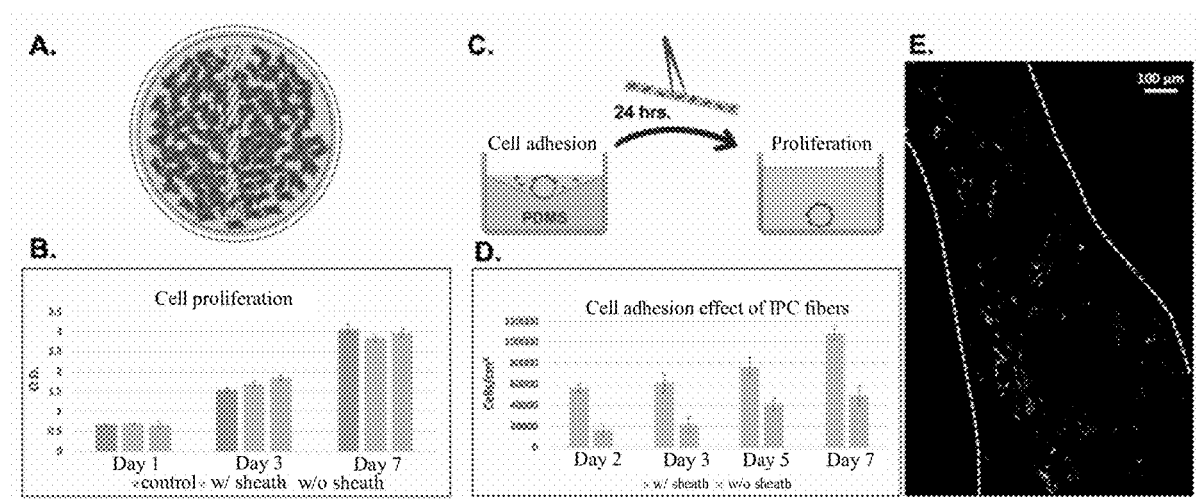
FIG. 7 shows the biocompatibility characteristics of the artificial tendon, in which PDMS represents polydimethylsiloxane.

This example investigates the biocompatibility characteristics of the artificial tendon. The result is shown in FIG. 7. It can be seen from B that there is no significant difference between the three groups (control, with sheath and without sheath) regarding cell proliferation when co-culture with fibers. It can be seen from D that, regarding the effect of cell adhesion, the group of silk fibroin sheath greatly improves the amount of cell adhesion of mesenchymal stem cells on the fibers. This example compares the effects of sheath and no sheath on cell adhesion, so it must be determined by the performance of cell culture experiments.

Example 5

Figure 8:
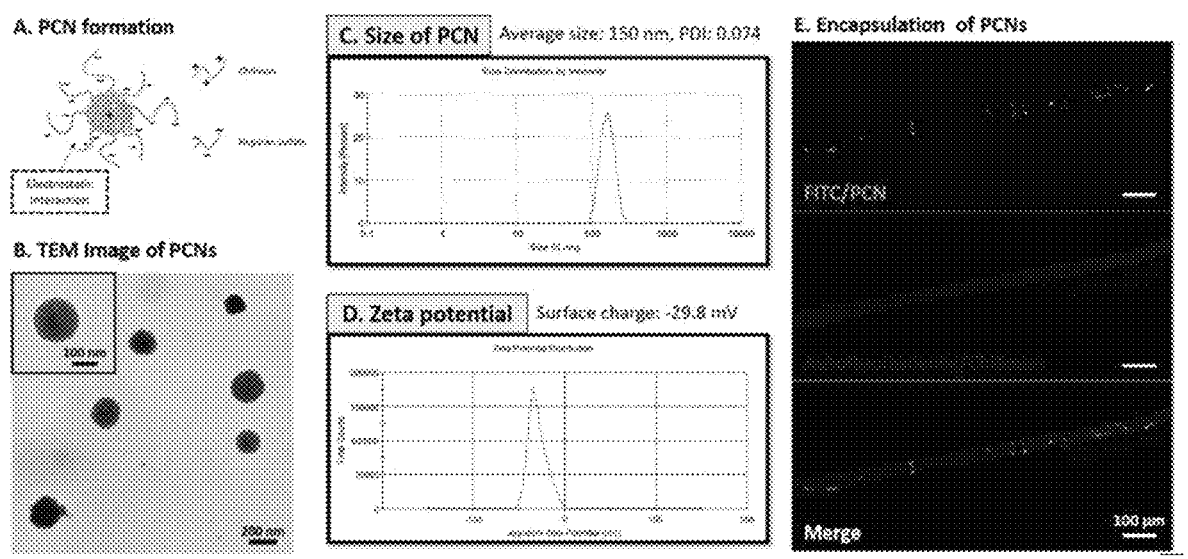
FIG. 8 shows the characteristics of the polyelectrolyte complex nanoparticles (PCNs) of the artificial tendon, in which TEM represents transmission electron microscopy.

Characteristics of Polyelectrolyte Complex Nanoparticles (PCNs) of Artificial Tendon This example investigates that the artificial tendon comprises polyelectrolyte complex nanoparticles (PCNs) and has the characteristics of PCNs. PCNs are small enough to be encapsulated by the artificial tendon. PCNs are added to the solution to adsorb growth factors, so that the combination can stabilize and release the growth factors slowly (that is, the growth factors are not simply mixed directly into the solution). Growth factors are such as transforming growth factor beta (TGF-β), insulin-like growth factor 1 (IGF-1), platelet-derived growth factor (PDGF), vascular endothelial growth factor (VEGF), connective tissue growth factor (CTGF) or fibroblast growth factor 2 (FGF2). The result is shown in FIG. 8. It can be seen from FIG. 8 that A shows the synthesis mechanism of PCN, which is the same concept as IPC and is composed of polymers with positive and negative charges. B shows the morphology of PCN taken by transmission electron microscopy (TEM). C and D are the particle size analysis tests for PCN, which can measure the particle size and surface electrical properties of the particles. Through this test, it can be known that the average size of PCN is 150 nm, which can be well encapsulated in IPC fibers with a diameter of 15 μm. The surface electrical property with negative charge also agrees with the design concept of the present invention, while chitosan as the positive charge material is selected here. Negatively charged heparan sulfate can be used to bind positively charged growth factors on the surface. E is a picture of the distribution of nanoparticles in the fiber, it can be observed that the distribution is very homogeneous, and there is no excessive concentration. In addition, regarding the influence of the position of growth factors on the release profile, when growth factors are placed at the core position, TGF-β is released slowly, which is more in line with the needs of tendon regeneration and repair.

Example 6

PCN Releasing Test of Artificial Tendon

Figure 9:
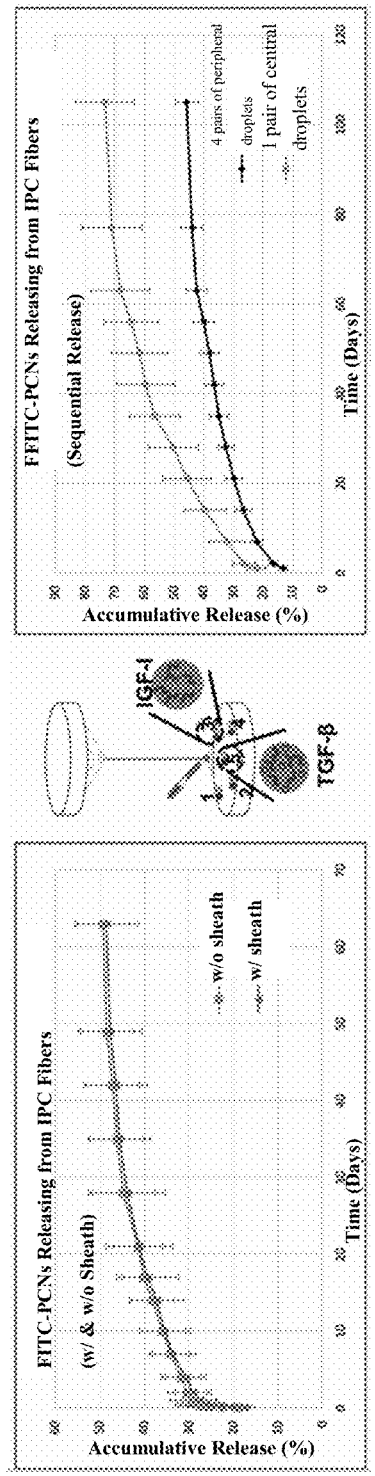
FIG. 9 shows the PCN releasing test, in which IPC represents interfacial polyelectrolyte complexation, FITC represents fluorescein isothiocyanate, IGF-1 represents insulin-like growth factor 1, TGF-β represents transforming growth factor beta.

This example investigates the PCN releasing test of the artificial tendon. The result is shown in FIG. 9. It can be seen from the left and middle schematic diagrams in FIG. 9 that same amount of PCNs in 5 pairs of droplets for the comparison between with and without sheath. It can be seen from the right and middle schematic diagrams in FIG. 9 that different drug releasing profile is achieved by different sets of droplets. The PCNs in the set of 4 peripheral droplets (1, 2, 3, 4) release much faster than those in the set of central droplets (5). Growth factors (TGF-β) in the central droplets (5) can be kept from burst release to fit the tendon regeneration process, showing the possibility to achieve sequential release.

In summary, the present invention uses interfacial polyelectrolyte complexation spinning, and collocates with the self-designed collection machine to produce micron and millimeter-scale fibers, and through the weaving method, it is made into a tailor-made artificial substitute, which is applied to artificial tendons with high tensile strength and durability.

Although the present invention has been described with reference to the preferred embodiments, it will be apparent to those skilled in the art that a variety of modifications and changes in form and detail may be made without departing from the scope of the present invention defined by the appended claims.

What is claimed is:

1. A method for preparing an artificial tendon, comprising the following steps:
   (a) forming an artificial fiber through interfacial polyelectrolyte complexation spinning (IPC spinning) process, wherein the artificial fiber is formed by spinning on a machine using a positively charged polysaccharide polymer and a negatively charged polyamino acid polymer;
   (b) coating the artificial fiber with a protein to form a coated artificial fiber;
   (c) twisting the coated artificial fiber to form an artificial fiber bundle; and
   (d) using a weaving method to braid the artificial fiber bundle to form the artificial tendon with a hierarchical structure;
   wherein in step (a), the positively charged polysaccharide polymer and the negatively charged polyamino acid polymer are respectively in a form of positively charged droplets and negatively charged droplets, and the positively charged polysaccharide polymer and the negatively charged polyamino acid polymer are dropped on the machine, and the artificial fiber is fabricated by contact of the positively charged droplets and the negatively charged droplets through pulling upward.

2. The method according to claim 1, wherein the positively charged polysaccharide polymer is chitosan.

3. The method according to claim 1, wherein the negatively charged polyamino acid polymer is poly-γ-glutamic acid (γ-PGA).

4. The method according to claim 1, wherein in step (b), the protein is silk fibroin.

5. The method according to claim 1, wherein in step (d), the weaving method is a three-strand braid interlaced weaving method.

6. The method according to claim 1, wherein an amount of the positively charged droplets or the negatively charged droplets is five drops.

7. The method according to claim 1, wherein the contact of the positively charged droplets and the negatively charged droplets forms the artificial fiber with orientation of droplets to form shield-core structure, a binary structure or a micro-array structure.

8. The method according to claim 1, wherein the artificial tendon is loaded with a growth factor.

9. The method according to claim 8, wherein the growth factor is transforming growth factor beta (TGF-β), insulin-like growth factor 1 (IGF-1), platelet-derived growth factor (PDGF), vascular endothelial growth factor (VEGF), connective tissue growth factor (CTGF), or fibroblast growth factor 2 (FGF2).

10. The method according to claim 8, wherein the artificial tendon comprises a polyelectrolyte complex nanoparticle (PCN), the PCN is formed by polymerization of the positively charged polysaccharide polymer and a negatively charged glycosaminoglycan polymer through positive and negative attraction, the positively charged polysaccharide polymer is chitosan, and the negatively charged glycosaminoglycan polymer is heparan sulfate.

11. An artificial tendon, which is prepared by the method according to claim 1.

12. The artificial tendon according to claim 11, wherein the positively charged polysaccharide polymer is chitosan.

13. The artificial tendon according to claim 11, wherein the negatively charged polyamino acid polymer is poly-γ-glutamic acid (γ-PGA).

14. The artificial tendon according to claim 11, wherein in step (b), the protein is silk fibroin.

15. The artificial tendon according to claim 11, wherein in step (d), the weaving method is a three-strand braid interlaced weaving method.

16. The artificial tendon according to claim 11, wherein an amount of the positively charged droplets or the negatively charged droplets is five drops.

17. The artificial tendon according to claim 11, wherein the contact of the positively charged droplets and the negatively charged droplets forms the artificial fiber with orientation of droplets to form shield-core structure, a binary structure or a micro-array structure.

18. The artificial tendon according to claim 11, wherein the artificial tendon is loaded with a growth factor.

19. The artificial tendon according to claim 18, wherein the growth factor is transforming growth factor beta (TGF-β), insulin-like growth factor 1 (IGF-1), platelet-derived growth factor (PDGF), vascular endothelial growth factor (VEGF), connective tissue growth factor (CTGF), or fibroblast growth factor 2 (FGF2).

20. The artificial tendon according to claim 18, comprising a polyelectrolyte complex nanoparticle (PCN), wherein the PCN is formed by polymerization of the positively charged polysaccharide polymer and a negatively charged glycosaminoglycan polymer through positive and negative attraction, the positively charged polysaccharide polymer is chitosan, and the negatively charged glycosaminoglycan polymer is heparan sulfate.

* * * * *